United States Patent
Gubela, Sr.

(10) Patent No.: US 7,135,671 B2
(45) Date of Patent: Nov. 14, 2006

(54) WIDE-ANGLE SENSOR SYSTEM WITH A CUBE CORNER REFLECTOR, AND PRODUCTION OF THE MOLDS

(76) Inventor: Hans-Erich Gubela, Sr., Schleifweg 2, D-77871 Renchen (DE)

(*) Notice: Subject to any disclaimer, the term of this patent is extended or adjusted under 35 U.S.C. 154(b) by 352 days.

(21) Appl. No.: 10/412,936

(22) Filed: Apr. 14, 2003

(65) Prior Publication Data

US 2003/0193717 A1 Oct. 16, 2003

(30) Foreign Application Priority Data

Apr. 14, 2002 (DE) .................................. 102 16 579

(51) Int. Cl.
*H01J 3/14* (2006.01)
*G02B 5/122* (2006.01)

(52) U.S. Cl. .................... 250/216; 359/529; 359/530
(58) Field of Classification Search ................ 250/216, 250/237 G; 359/529–533
See application file for complete search history.

(56) References Cited

U.S. PATENT DOCUMENTS

| | | | |
|---|---|---|---|
| 3,923,378 A * | 12/1975 | Heenan | 359/530 |
| 4,189,209 A | 2/1980 | Heasley | 359/530 |
| 4,588,258 A | 5/1986 | Hoopman | 359/530 |
| 5,565,151 A * | 10/1996 | Nilsen | 264/1.1 |
| 6,318,866 B1 * | 11/2001 | Mimura et al. | 359/530 |
| 6,353,489 B1 * | 3/2002 | Popovich et al. | 359/15 |
| 6,386,855 B1 | 5/2002 | Luttrell et al. | 425/193 |

FOREIGN PATENT DOCUMENTS

| | | |
|---|---|---|
| DE | 44 10 994 | 10/1995 |
| DE | 297 07 066 | 9/1997 |
| DE | 197 27 527 | 10/1999 |
| DE | 101 19 671 | 10/2002 |
| EP | 0 844 056 | 7/1996 |
| GB | 269760 | 4/1927 |
| WO | WO 94/18581 | 8/1994 |
| WO | WO 01/38906 | 5/2001 |

* cited by examiner

*Primary Examiner*—Thanh X. Luu
(74) *Attorney, Agent, or Firm*—Collard & Roe, P.C.

(57) ABSTRACT

A wide angle reflector which can work in conjunction with a wide-angle sensor system for testing the wide angle reflector. In this case, reflex sensors transmit light onto a cube corner part surface, and measure the retro-reflected light. If the direction of irradiation of the light deviates too strongly from the normal to the cube corner part surface, the retro-reflective light, which serves as signal, is retro-reflected too weakly, or is not retro-reflected at all to the transmitter. This wide-angle sensor system with a cube corner part surface permits the observation of a large surface with an aperture angle of 80° and more. In addition, the wide-angle sensor system with cube corner part surface comprises a gauge for selecting the observation angle and the cube corner part surface which comprises a multiplicity of cube corners. In this case, the cube corner part surfaces, arranged around the center of the cube corner, are positioned at virtually a right angle to one another, and the axes of the cube corners deviate alternately by, for example +/−5° or more from the normal to the reflector surface.

17 Claims, 15 Drawing Sheets

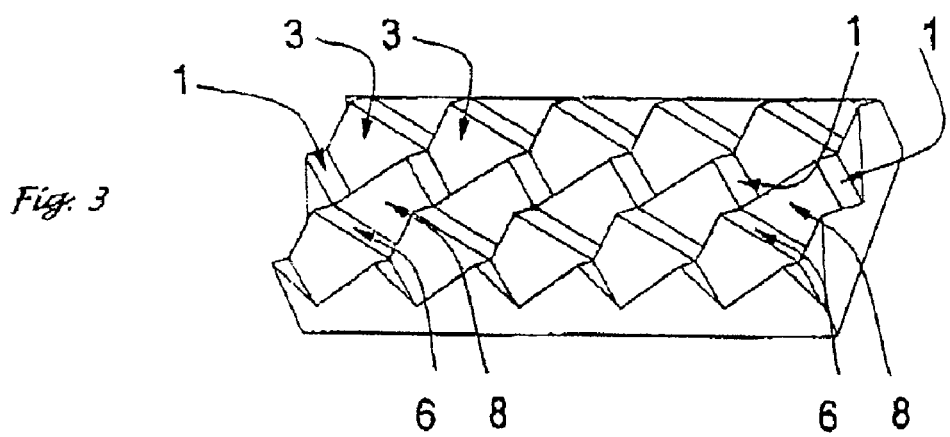
Fig. 3
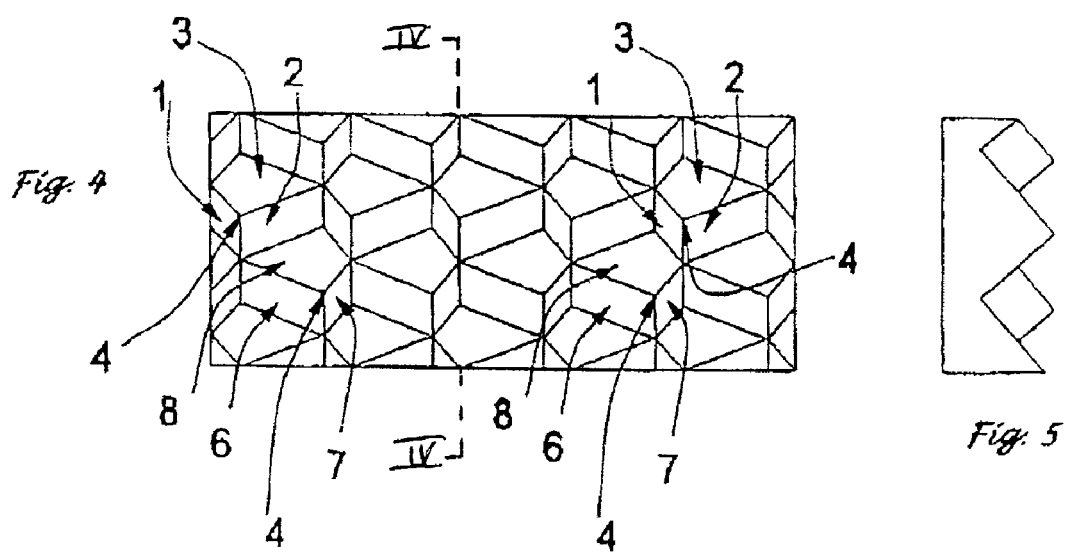
Fig. 4
Fig. 5
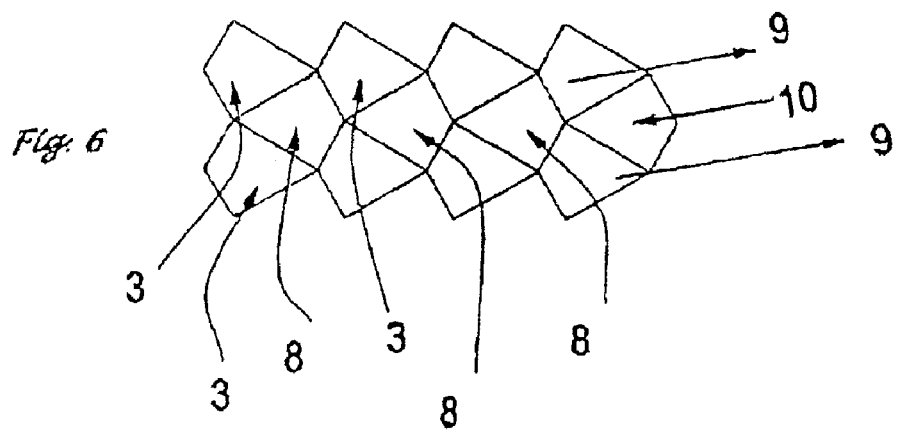
Fig. 6

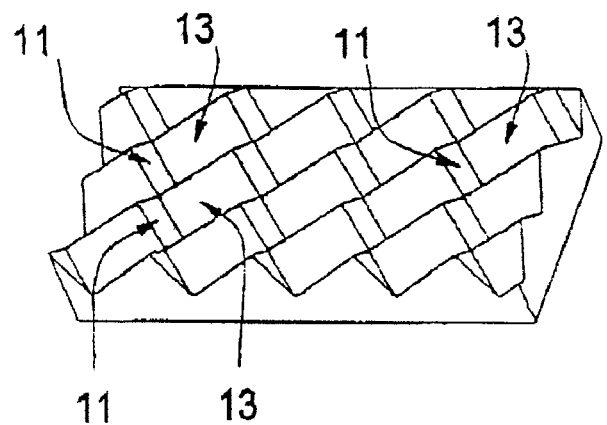
Fig. 7
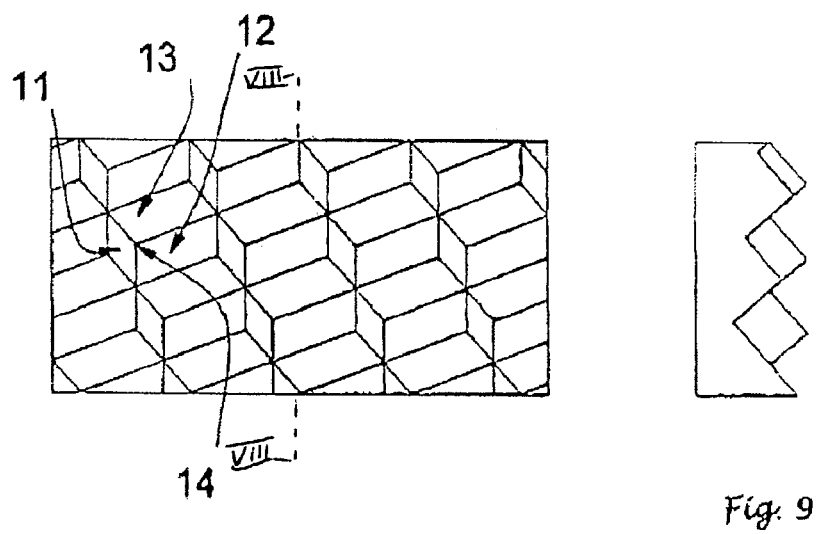
Fig. 8
Fig. 9
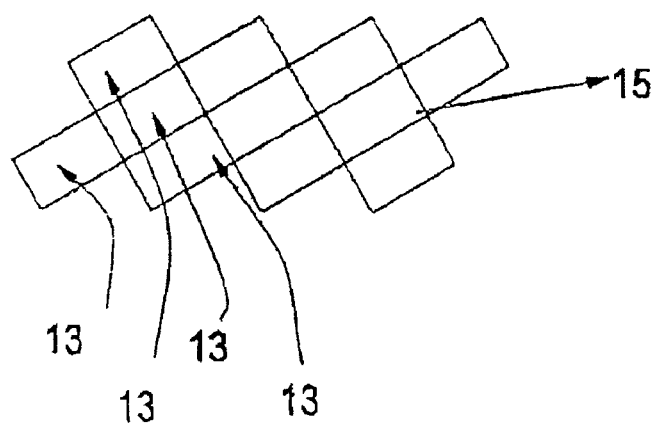
Fig. 10

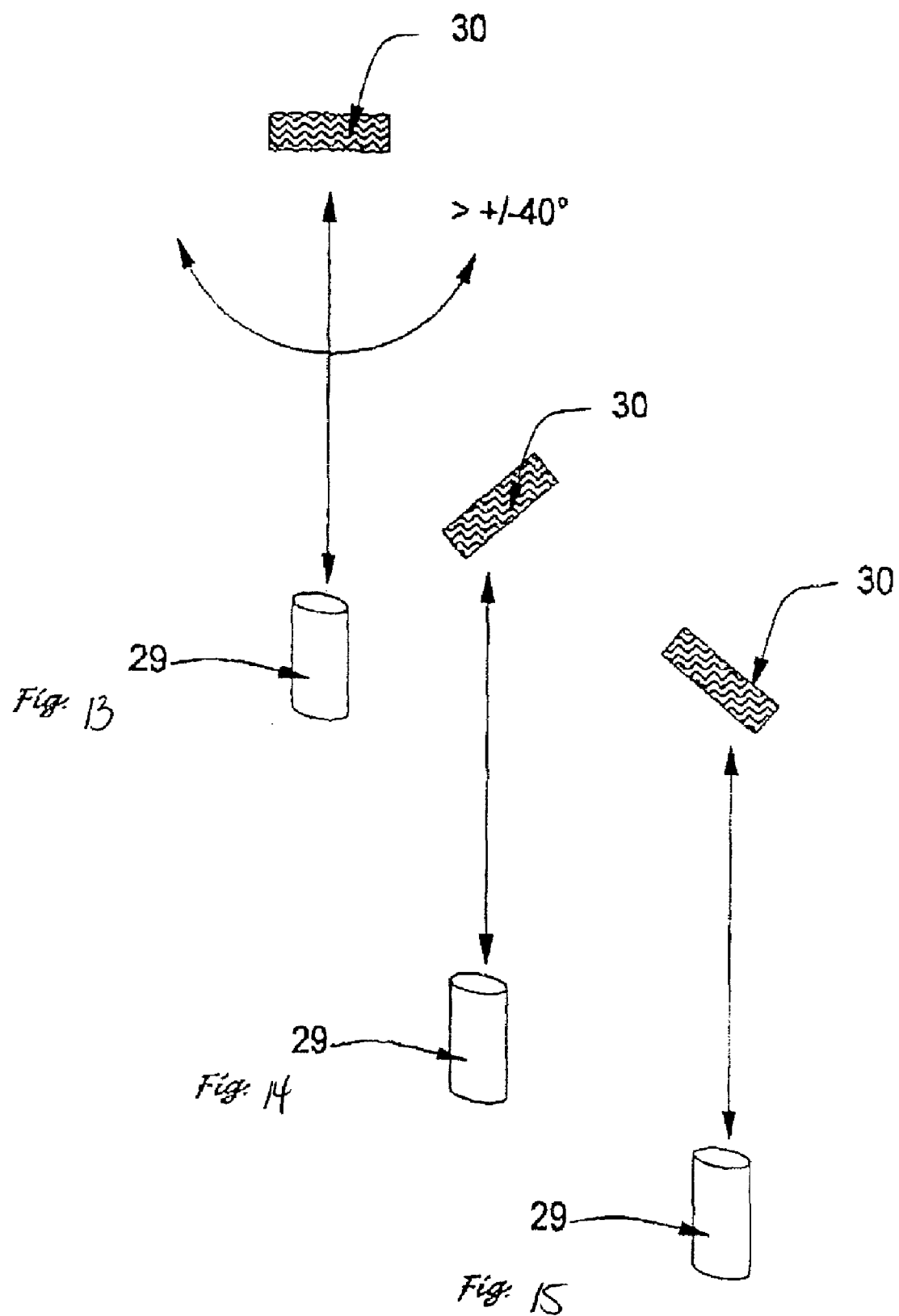

PHOTOMETRIC MEASUREMENT RESULTS

| Program : | | | |
|---|---|---|---|
| Retroreflective characteristic - angle of illumination | | | |
| Test sample ... : | IMOS wide angle 1 | | |
| Part No. ..... : | | | |
| Report No. ... : | 535675 | | |
| Measurement No. : | | | |
| Name:<br>Date:<br>File: | Anders<br>March 28, 2002<br>535675.1 | X offset:<br>Y offset: | 0.00°<br>-.50° |

| Test point | Specification Minimum | Maximum | Measurement [mcd/lx] | Nio |
|---|---|---|---|---|
| 0.2° HV    | – | – | 9 510 | |
| 0.2° H5:V  | – | – | 9 010 | |
| 0.2° H10:V | – | – | 6 280 | |
| 0.2° H15:V | – | – | 6 030 | |
| 0.2° H20:V | – | – | 5 920 | |
| 0.2° H25:V | – | – | 5 580 | |
| 0.2° H30:V | – | – | 4 990 | |
| 0.2° H35:V | – | – | 4 300 | |
| 0.2° H40:V | – | – | 3 510 | |
| 0.2° H45:V | – | – | 578 | |
| 0.2° H50:V | – | – | 247 | |
| 0.2° H:5V  | – | – | 8 680 | |
| 0.2° H:10V | – | – | 7 910 | |
| 0.2° H:15V | – | – | 7 040 | |
| 0.2° H:20V | – | – | 3 430 | |
| 0.2° H:25V | – | – | 789 | |
| 0.2° H:30V | – | – | 366 | |
| 0.2° H:35V | – | – | 205 | |
| 0.2° H:40V | – | – | 126.3 | |
| 0.2° H:45V | – | – | 78.9 | |
| 0.2° H:50V | – | – | 46.2 | |

Fig. 33

WIDE-ANGLE SENSOR SYSTEM WITH A CUBE CORNER REFLECTOR, AND PRODUCTION OF THE MOLDS

CROSS REFERENCE TO RELATED APPLICATIONS

Applicant claims priority under 35 U.S.C. §119 of German Application No. 102 16 579.3 filed Apr. 14, 2002. The international application under PCT article 21(2) was not published in English.

BACKGROUND OF THE INVENTION

The invention relates to a method and construction of a reflector for wide angle observation of a reflecting surface via a reflex sensor which may also be equipped with polarization filters, or can operate as a laser reflex sensor.

The wide-angle sensor system with a cube corner surface comprises a gauge for selecting the observation angle. The cube corner surface comprises a multiplicity of cube corners. The cube corner part surfaces arranged around the center of the cube corner, specifically its reflecting sides, are at right angles to one another. The axis of the cube corners deviate alternately by −5° and +5° or more from the axis normal to the reflector surface. The surface of at least one cube corner surface is lengthened substantially.

The aim of the wide-angle sensor system with a cube corner part surface is to create a reflex sensor system wherein it is possible to observe a surface with an aperture angle of approximately 80° and more in conjunction with a retro-reflective value at each angle of illumination of the observed horizontal surface of at least 3000 mcd/lx.

Moreover, this system can be used to observe moving bodies in space, for example vehicles or transport gondolas, even if these bodies are changing their angle relative to the observer. For example, a conveyor gondola can be viewed when being guided in a curve. A connected measuring system, for example for measuring distance or position, can operate reliably, only because the intensity of a reflection signal from the body to be observed is always received at a strong enough level of at least 3,000 mcd/lx.

The problem is that there have not been any qualitatively satisfactory reflecting surfaces which continuously supply an intensive retro-reflection signal available on the market for the tasks of reflex sensor technology. This is particularly true when the reflecting surface is positioned deviating at 40° or more from the normal to the reflection signal. The retro-reflectors or reflecting films on the market having wide angled properties are conceived for road traffic, for reflecting sign boards or retro-reflectors for personal protection on clothes. These reflecting structures produce a wideband distribution of the reflected light. It follows that their reflected light energy is insufficient to provide reflex sensors with focused reliable retro-reflection signals. For reflex sensors, there is a need for as large as possible portion of the light to be retro-reflected on target to the receiver.

Only with constant, high retro-reflective power is it possible to have a signal read by a sensor having an additional polarization filter system which consumes half to two-thirds of the transmitted light. This energy is no longer available to the receiver of the sensor for the purpose of further interpretation. The polarization filter system serves chiefly to distinguish the light emitted by the sensor. It is then rotated in polarity and retro-reflected by the retro-reflector from extraneous light or reflections which can emanate from other bodies in space. The wide-angle system according to the invention with its cube corner reflector of specific design, permits the operation of the sensor with a polarization filter system.

Moreover, this novel cube corner reflector can also be constructed, using known technology, as a microcube reflector, as is required, for laser sensor technology or film technology. The requirements for laser sensor technology are described for this purpose by the inventor in German Patent DE 197 27 527 incorporated herein by reference. The point is that pyramidal cube corner surfaces are completely unsuitable for the stated aim of the present invention. This is because they retro-reflect only approximately 66% of the light, and that they are unsuitable for the required light beam contour and precision for laser sensors. The invention therefore utilizes a specific configuration of full-cube cube corners.

Full-cube corners whose cube corner axis deviates from the axis normal to the reflector, are familiar in production in retroreflector technology.

The cubic, reflecting mirror system known in metrology as the Perkin-Elmer pyramid is known to the prior art and is currently designated as full cube in the case of retroreflectors. A full-cube cube corner consists of three square mirrors which are at right angles to one another and retroreflect the light to the light source. Stimson describes in Great Britain Patent GB-B 269 760 incorporated herein by reference, a series of molds which produce the cubic, reflecting surfaces by using individual ground pins or notched plates.

Gubela describes in German Disclosure Reference DE 44 10 994, incorporated herein by reference, bodies and/or components of a billet-shaped cube corner reflector and/or mold element for molding cube corner reflectors with full cube properties. These billet-shaped components can be assembled to form surfaces with particular ease in microstructure technology and constitute a production technology which is also suitable for producing molded parts or presenting the reflector according to the invention with wide angle properties for the sensor tasks.

The reflector described in the present invention, and the production of the molds, are based on the known methods for producing cube corner reflectors, but select a novel shape, which comes close to but differs from the full cube.

There are also other cube corner shapes such as the three-faced pyramid. However, the preferred design is that of a variation of the full cube, since it basically has a substantially lower scattering loss than the pyramid. Pyramidal cube corner structures can be cut from a flat common surface, whereas full-cube cube corners require the arrangement of a multiplicity of components in the mold construction to represent large structured surfaces of a multiplicity of cube corners. The manufacturing methods and their advantages and disadvantages in the production of cube corners are known to the person skilled in the art and need not be repeated here.

The invention makes use of the presence and use of full-cube cube corners in technology. The full-cube cube corner has the excellent property of receiving incident light over a wide tolerance range of the incidence angle, and retro-reflecting it substantially completely to the light source. The retro-reflection is performed via the reflection of light at the three square surfaces of the full-cube cube corner. This angular tolerance for the incident light is currently being used in practical application in the case of most reflection light barriers. The mounting and alignment of the retro-reflector at the correct angle to the transmitter/receiver system is simple and fault-tolerant. Vibration-induced beam movements are also mostly tolerated by this reflective element with full-cube cube corners.

When using laser light sensors, the application of cube corners as reflective element becomes very difficult. This is because in inexpert application, the laser supplies information relating to its movement on the retro-reflection structure and information relating to the shape of the retro-reflection structure, instead of information relating to the space to be observed between the transmitter/receiver and retro-reflecting mirror. German Reference DE 197 27 527 shows how retro-reflecting mirrors must be shaped for laser sensors, and also explains the differences between full-cube and pyramidal cube corners and teaches which shape the laser sensor beam must have. As a result of applying the known teaching, the advantages of the structure composed of full-cube cube corners are also obtained with laser sensors in the case of the present invention. It is likewise possible to use the inventive reflector of the wide-angle sensor system.

The text below further discusses only cube-corner systems which can be assigned to the full cube. It is necessary to distinguish in the case of cube corners between the pyramidal cube corners, which can be cut from a base surface, and full-cube cube corners which, by contrast, can be produced only by assembling subsegments.

Regarding the Perkin-Elmer pyramid, the part surfaces of the cube corners are square, the inventive wide-angle sensor system uses as cube corner reflector a specific variation of the full-cube cube corner. In this case, at least one cube corner surface is substantially larger than the smallest cube corner part surface.

This enlarged, lengthened cube corner part surface assists in collecting light incident even from a very wide angle, and in passing it on to the remaining cube corner part surfaces such that the light is retro-reflected in the direction of the light source. The result is a cube corner which operates in practice in a substantially wider angled manner than in previous designs.

By contrast, in the case of retro-reflectors for motor vehicles, for example, reflecting surfaces acting over a wide angle are represented by cambering the entire reflector. The reflector surface is formed from a multiplicity of individual reflecting pins which look in the desired directions, such that a plastic wide angle reflector that can then be molded by means of electrochemical forming. The cube corners produced in this case always have virtually square cube corner part surfaces of the same size. The wide-angle nature of the reflector produced is then based only on the fact that cube corners with differently aligned cube corner axes have been combined. Depending on the incidence angle of the light, there is always only a very small portion of the cube corners working, whose axes look in the direction of the light. Thus with this design, the retro-reflective power is accordingly very low.

Manufacturing methods have been selected for the reflector of the present invention which produce a specific cube corner surface whose character differs plainly from reflecting surfaces which have been formed by pins. In the case of full-cube reflectors, which are represented by pins, the cube corner part surfaces are approximately of the same size and square. At least one cube corner part surface is substantially larger per cube corner than the smallest cube corner part surface of the cube corner in the case of the specific variation of the full-cube cube corner as it is used in the reflector according to the invention. The substantially enlarged, specifically lengthened cube corner part surface permits light incident from a very wide angle to be collected, and allows for excellent retro-reflective values (see FIGS. 32 and 33).

Some of the drawings and illustrations of this description of the invention resemble disclosure document DE 101 19 671 of the same inventor, which is incorporated herein by reference. The similarity is based on the similarity of the production techniques used for the cube corner shapes.

The specific cube corner shape according to the invention with an enlarged, lengthened cube corner part surface is achieved by presenting the cube corners using the plate method, which is described by Stimson in British Patent GB-B 269 760. Of course, in departure therefrom, modern manufacturing techniques are used as well as materials of microstructure technology. However, the inventive structure of the reflector deviates clearly from Stimson. The cube corner is cut in alignment with the axis which is normal to the reflective surface, in the case of the inventive reflector, the cube corner axes of the cube corners are aligned so that they deviate strongly from the normal to the reflector surface, specifically at least +/−5°. This alignment is in a manner combined with cube corners whose cube corner axes deviate, for example, +/−15° from the axis normal to the reflector surface.

The desired lengthened cube corner part surface is produced by notching the mold element plates upon application of the Stimson plate method by the oblique wedge-shaped incision in the plates.

A cube corner part surface which is still likewise long, but by contrast virtually unbounded in width, is obtained upon using the plate method as it has been described by Gubela in German Patent Application DE 44 10 994 C2, incorporated herein by reference for example in FIGS. 13 and 14 in that application.

In the Gubela method, an alignment of the cube corner axes of 5° deviating from the axis normal to the reflector surface, is very advantageous for the inventive wide-angle sensor system. After all, when the reflector is presented with the aid of this method, a wide-angle property is additionally obtained not only in the horizontal direction, but also in the vertical direction.

SUMMARY OF THE INVENTION

The invention relates to a system including a wide angle sensor having a reflector in which an opto-receiver is installed relative to an opto-transmitter such that the observation angle is as small as possible. The observation angle of 0° means that the opto-receiver is positioned relative to the opto-transmitter such that the light retro-reflected by the reflector is received on the same axis on which it was transmitted. Such arrangements are known in sensor technology and are achieved, for example, by using semitransparent mirrors or beam splitters. However, some light energy is lost in this design, because undesired beam paths also occur. To avoid such complicated optical devices, the present inventive sensor system uses an opto-receiver that can be positioned as close as possible to the axis of the opto-transmitter for example at an observation angle of greater than 0°, such as 0.2°, but not more than 1°. The reflector can then be observed over a horizontal angle of approximately +40° to −40°, which corresponds to an aperture angle of approximately 80° for the surface observed by the sensor, and to a permanent retro-reflective power of the reflector of more than 3000 mcd/lx. The aperture angle can be further substantially expanded by varying the cube corner axes of some cube corners in the reflector up to approximately +/−15° and more. By tilting the cube corner axis away from the axis normal to the reflector surface, and by enlarging the cube corner axis, this also enlarges the lengthened cube corner part surface, which catches the light much more effectively. The effect of the inventive system is that based on this specific cube corner configuration of the reflector, which includes not only by swiveling the cube corner axis, but also by means of the enlargement, of the lengthened cube corner part surface achieves a larger reflective surface angle and area. Thus, given horizontal swiveling of the cube corner axes by +/−5°, a horizontal wide-angle property of more than 40° is already achieved, but in this case the extremely high reflective power of more than 9000 mcd/lx remains for horizontal and vertical angles of 0°.

The invention therefore permits the creation of a wide angle sensor system with a cube corner reflector via an observation angle of the wide angle sensor of 1° or less. It also permits the configuration of a cube corner array for the reflector which consists of a multiplicity of full-cube cube corners, of which the predominant number of cube corners has at least a substantially lengthened cube corner part surface and cube corner axis is inclined by +/−5° or more with reference to the normal to the light entry surface. The invention is also the use of a production method of the full-cube cube corner by means of Stimson plates or Gubela billets such that, over an illumination angle of +/−40° or more, the wide angle sensor receives over its entire observation angle of 80° or more a retro-reflection signal whose retro-reflective value never drops below 3000 mcd/lx, and such that the wide angle sensor can also be equipped with a polarization filter. In addition, the reflector can be equipped on the light entry surface with a Fresnel lens which increases the wide-angle property of illumination.

The reflector may be constructed as a hard part, an embossed part, or an elastic film. The cube corners may have a metal surface, applied to a shaping support body, wherein the metal surface is applied by vapor coating or sputtering.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 3 shows a wide angle mirror structure of the reflector which is assembled from cube corners of FIG. 1;

FIG. 4 shows a top view of the wide angle mirror structure of FIG. 3;

FIG. 5 shows a view through section IV—IV in FIG. 4 of the wide angle mirror structure in FIG. 4;

FIG. 6 shows a rotated view of the wide angle mirror structure shown in FIG. 3;

FIG. 7 shows a wide angle mirror structure assembled from the corners in FIG. 2;

FIG. 8 shows a top view of the wide angle mirror structure shown in FIG. 7;

FIG. 9 shows a cross-sectional view of the wide angle mirror structure of FIG. 8 taken through the line VIII—VIII;

FIG. 10 shows a wide angle mirror structure of the reflector of FIG. 7 in a rotated manner;

FIG. 13 shows a schematic view of a sensor for observing a reflector positioned at a first angle;

FIG. 14 shows a schematic view of a sensor for observing a reflector positioned at a second angle;

FIG. 15 shows a schematic view of a sensor for observing a reflector positioned at a third angle;

FIG. 33 shows a table of the photometric measurement results.

DETAILED DESCRIPTION

Figure 1:
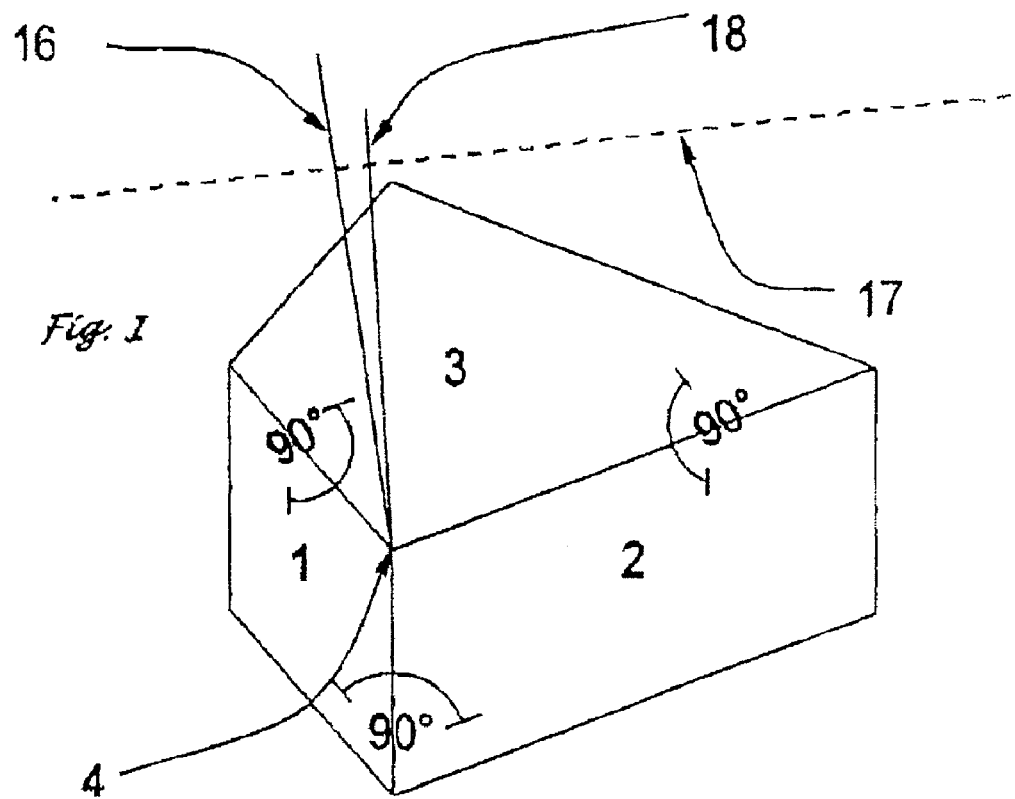
FIG. 1 shows a single cube corner of the wide angle mirror structure of the reflector.

Referring in detail to the drawings, FIG. 1 shows a single cube corner of the wide angle mirror structure of the reflector. The cube corner consists of three reflecting surfaces 1, 2, and 3 which are at near right angles to one another, specifically between 89° and 91°.

The slight deviations from 90° are necessary due to the different refractive properties of the plastics or glasses which are processed. These deviations are also important for the angular correction of the different shrinking behaviors of the materials which occur in mold construction. Metals used to form the reflector include stainless steel, nickel, brass, nickel silver, copper, aluminum, silver, and gold.

The shape of reflecting surface 3 is a scalene quadrilateral. This shape arises in conjunction with an inventive wide angle structure of the reflector when the structure in the horizontal is to be wide angled to both sides. The angle of inclination of the cube corner axes relative to the axis normal to the reflector surface is +5° for one group of the cube corners, and −5° for the second cube corner group. It is possible to add further cube corners with other angles of inclination of the cube corner axes of the wide angle structure, for example with angles of inclination of 0° or approximately +/−15°.

An essential feature of the cube corner is that the two cube corner part surfaces, such as reflecting surfaces 2 and 3, are substantially larger and longer than cube corner part surface 1. At least one cube corner part surface is to be substantially lengthened in the direction of the light to be received from a wide angle position. Thus, inventive lengthened corner cube part surface 2 supplies the wide-angle property of illumination in FIG. 3 of horizontal direction, while cube corner part surface 3 does so in a substantially smaller vertical direction (see also the table of FIG. 33).

The center of the cube corner is a lowest point 4 that is touched by all three reflecting surfaces. When projected onto a plane, the base surface of the cube corner is an irregular hexagon. The shape of the cube corner is fashioned such that it can be assembled with other similar cube corners to form a wide-angle mirror structure of the reflector, as shown in FIGS. 3 and 4, which can capture the incident light from two opposite directions. Light entry surface 17 of the reflector is positioned here in a manner not true to scale. Normal axis 16 to light entry surface 17 corresponds to a direct incidence angle of the light of 0° horizontally and vertically. In this example, the cube corner axis 18 of the cube corner is inclined to the cube corner part surface 2 by approximately −5° from normal axis 16 in a manner pointing away to the right.

The inclination of normal axis 16, makes it is possible to distinguish between the inclination toward the surfaces in this specific design instance even with reference to three different surfaces, and in relation to the inclination toward the edges of the cube corner. In this case it would likewise be necessary to take account of three different edges. A more detailed coordinate system for the inclination of the cube corner axis is not necessary for understanding the invention.

The starting point in the following examples is an inclination toward cube corner part surface 2.

To explain, negative values are inclination values pointing to the right for the observer. Positive values are inclination values pointing to the left.

The inclination could also be executed toward the edge of the cube corner which is formed by cube corner part surfaces 2 and 3. It is important for the present invention that the inclination of the cube corner axis takes place in the direction of the lengthened cube corner part surface or part surfaces, or toward the cube corner edge which is formed from these lengthened part surfaces. The inventive light capturing effect of the lengthened cube corner part surfaces thereby becomes active for the wide angle range.

Figure 2:
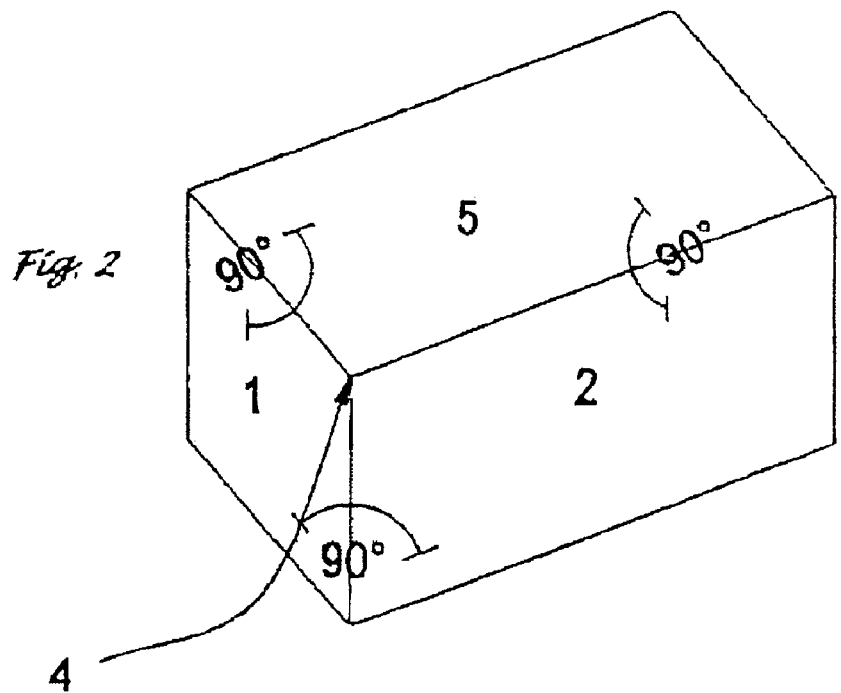
FIG. 2 shows a view of another single cube corner than that shown in FIG. 1.

FIG. 2 shows a single cube corner of the wide angle mirror structure of the reflector, belonging to a segment, as shown in FIGS. 7 to 10, of the wide-angle mirror structure which is aligned in a wide angle manner only toward one side for the illumination. This cube corner consists of three reflecting surfaces 1, 2, and 5 which are virtually at a right angle to one another. Like the cube corner in FIG. 1, it is aligned with its cube corner axis in a manner inclined to the right by −5° toward the cube corner surface 2.

The shapes of the cube corner part surfaces, such as, for example, reflecting surfaces 2 and 5, are stretched rectangles in each case. The center of the cube corner is at lowest point 4. The base surface, projecting onto a plane, of the cube corner is an irregular hexagon. The shape of the cube corner is such that it can be joined with other similar cube corners to form a wide angle mirror structure of the reflector, FIGS. 7 and 8, which receives the incident light predominantly from a spatial direction to the right of the normal, and retro-reflects it.

FIG. 3 shows a wide-angle mirror structure of the reflector which is assembled from cube corners of FIG. 1. In this perspective view, reflecting surfaces 2 and 7 of FIG. 4 are not visible at all. Reflecting surfaces 1 and 3 show the cube corners of the first alignment. Reflecting surfaces 6 and 8 show the cube corners of the second alignment in their position rotated by 180° relative to the cube corners of the first alignment. The cube corners of an identical alignment are arranged in rows. Rows of opposite alignment alternate with one another. The alignment of the cube corner approximately determines the spatial direction from which it preferentially receives light.

In these examples, the angle of inclination of the cube corner axis with respect to the normal is specified as negative when the inclination in FIG. 3 points to the right for the observer, and as positive when the inclination in the FIG. 3 points to the left.

This cube corner arrangement with +5° inclination of the cube corner axis of the rearmost row of cube corners, when combined with cube corners of the second row, whose angle axes of the cube corners are inclined by −5° produces a wide-angle property of 40° horizontally to both sides of the normal to the reflector surface. This means that the reflector is active over an aperture angle of more than 80°. Although in this example all the cube corners axes are inclined by −5° or +5°, given perpendicular light incidence following the normal, this cube corner arrangement results in a reflective power which corresponds to virtually 100% of a high power full cube reflector whose cube corner axes are not inclined. This is an unexpected result of this design according to the invention, namely that the unusually high, wide-angle property of illumination of the reflector according to the invention need not be gained at the expense of loss of power in the case of perpendicular light incidence.

FIG. 4 shows a top view of the wide-angle mirror structure of the reflector of FIG. 3, and thus the projection of all the edges onto a base surface. The reflector of FIG. 3 has a first set of cube corners in a first alignment, and a second set of cube corners in a second alignment. The first set 9 is formed by reflecting surfaces 1, 2, and 3 which are arranged around cube corner center 4, form the cube corner of the first alignment, as shown in FIG. 6, as element 9. The second set 10 is formed from reflecting surfaces 6, 7, and 8 which are arranged around the cube corner center 4 form the cube corner of the oppositely directed second alignment, as shown in FIG. 6, as element 10.

FIG. 5 shows the section through IV—IV in FIG. 4 which shows the wide-angle mirror structure of the reflector of FIG. 4. The section traverses the oppositely directed cube corner rows.

FIG. 6 shows the wide-angle mirror structure of the reflector in a manner rotated in space. Reflecting surfaces 8 of the set of cube corners 10 in the second alignment, and all reflecting surfaces 3 of the first set of cube corners 9 of the first alignment show a closed reflecting surface to the observer. It becomes clear here that the wide-angle mirror structure of the reflector can be seamlessly assembled from the cube corners of FIG. 1.

FIG. 7 shows the wide-angle mirror structure of the reflector, which is aligned to the right on one side and is assembled from cube corners of FIG. 2. Due to the perspective view, one reflecting surface 12 of FIG. 8 is not visible in each case.

FIG. 8 shows the same wide-angle mirror structure of the reflector of FIG. 7 from above, and thus the projection of all the edges onto a base surface. All the reflecting surfaces of the cube corners are rectangles.

Reflecting surfaces 11, 12, and 13 are arranged around the center of cube corner 14. All the cube corners are uniformly aligned and therefore receive light predominantly from the right-hand side of the normal.

FIG. 9 shows the section through the wide-angle mirror structure of the reflector of FIG. 8. The section traverses all cube corners arranged with the same alignment.

FIG. 10 shows the wide-angle mirror structure of the reflector of FIG. 7 in a manner rotated in space such that all the reflecting surfaces 13 of the cube corners of the same alignment 15 show a surface with a closed effect to the observer, like a single large mirror.

Figure 11:
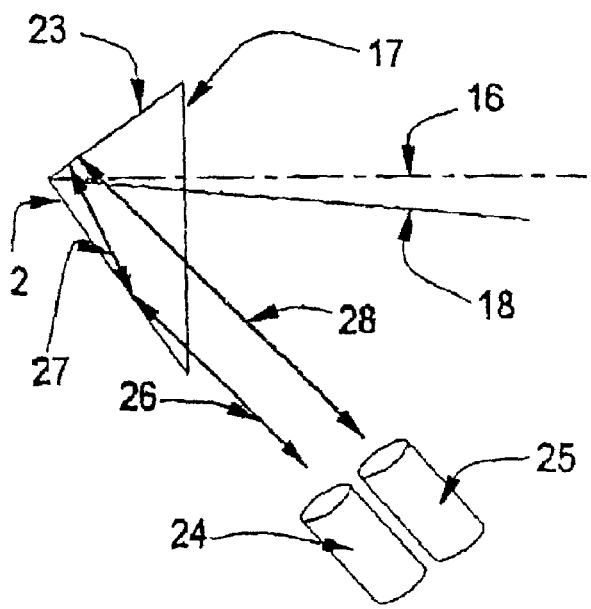
FIG. 11 shows a principle reflective properties of a cube corner with an extended surface.

FIG. 11 shows the principle of the cube corner with extended cube corner part surface 2. The two other cube corner part surfaces are situated opposite the latter virtually at a right angle, illustrated as a line 23 in this two-dimensional sketch. The cube corner axis 18 deviates by 5° from the axis 16 normal to light entry surface 17. Here, the cube corner axis is inclined toward extended cube corner part surface 2. Opto-transmitter 24 of the reflex sensor transmits light beam 26, which still encounters reference points on the extended cube corner part surface 2 inside the cube corner which permit the light to be retro-reflected to the receiver 25 via beam path 28. Even if the transmitter and receiver are exchanged in this example, this results in the beam path in the reverse direction.

In the case of the inventive action of the wide-angle property of illumination according to the invention, refraction effects at the edge formed from 2 and 17 of the extended cube corner part surface probably also expand the possibilities of illumination.

Figure 12:
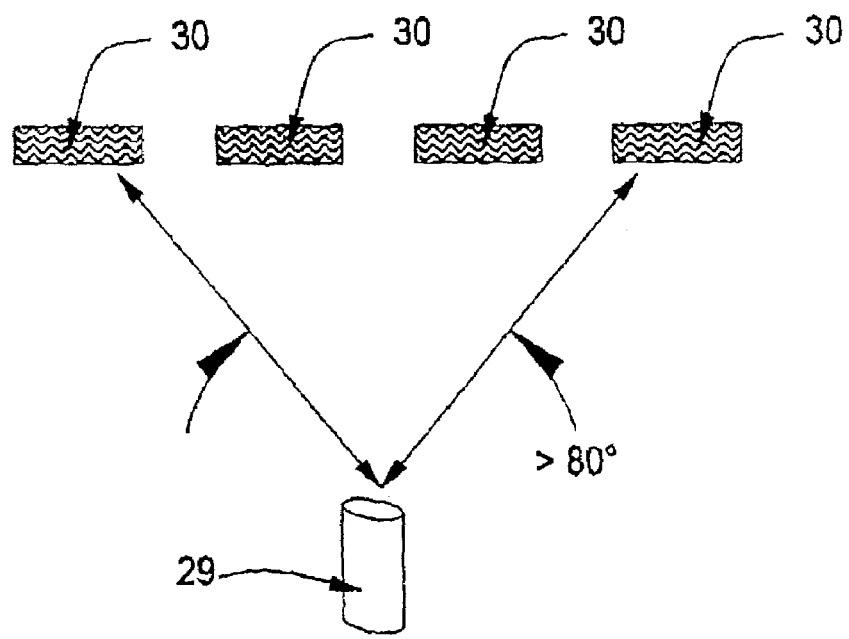
FIG. 12 shows a schematic view of a sensor for observing a plurality of reflectors.

FIG. 12 shows the sensor 29, which can observe the reflectors 30 with a horizontal aperture angle of greater than 80°.

FIGS. 13, 14 and 15 show sensor 29 which can observe the reflectors even given a rotation deviating by more than +/−40° from the beam path between the sensor and reflector.

Figure 16:
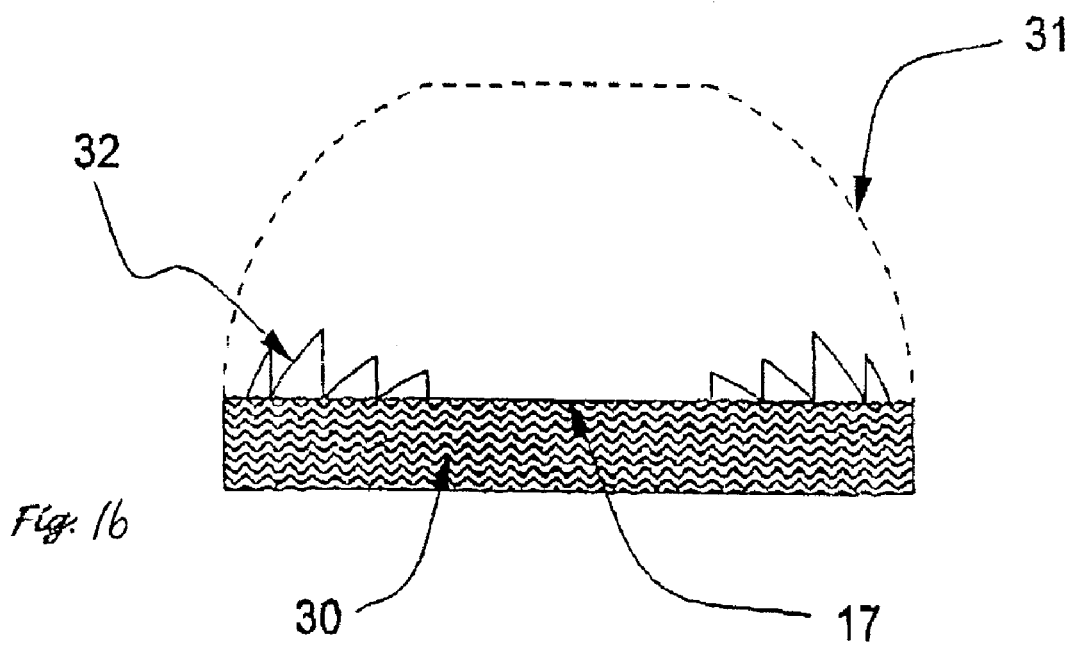
FIG. 16 shows a vertical cross-sectional view of a reflector shown in FIG. 17 which shows an optional Fresnel lens.

FIG. 16 shows, in a vertical section, reflector 30, which has additionally optionally been structured superficially with a Fresnel lens on light entry side 17. In this view, there are a plurality of angled reflective surfaces 32, formed as concentric circles. The Fresnel lens, shown in a dashed line, further amplifies the capacity of the reflector for a wide-angle property. The theoretical lens shape 31 has an arc flattened in the center, and determines the shape of the Fresnel structure, which is applied linearly in circles in this example. The Fresnel structure can be fabricated with known technology in a micronized manner using a machining method.

Figure 17:
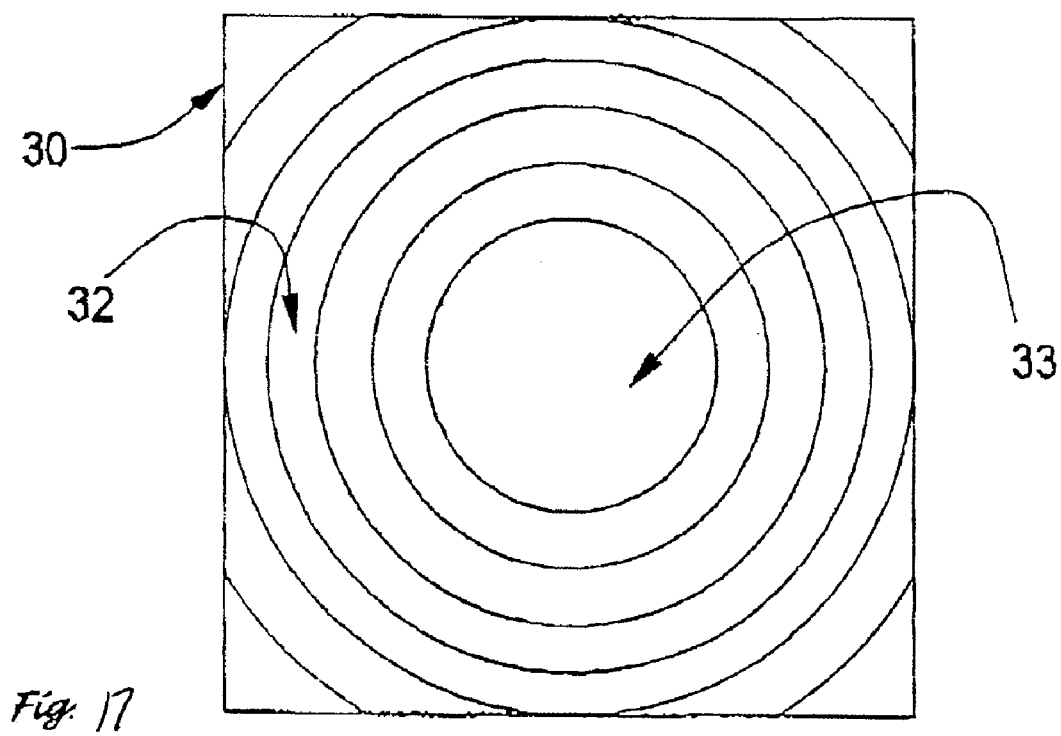
FIG. 17 shows a view of a light entry surface of the reflector shown in FIG. 16.

FIG. 17 shows reflector 30 of FIG. 16 in a view onto light entry surface 17 with the linear circles of Fresnel structure 32 and flat center 33 of the surface of light entry side 17 which has not been structured. The Fresnel lens can also have a completely different shape for particular sensing tasks.

The reflector can also additionally be cambered into itself or only the light entry side.

Figure 18:
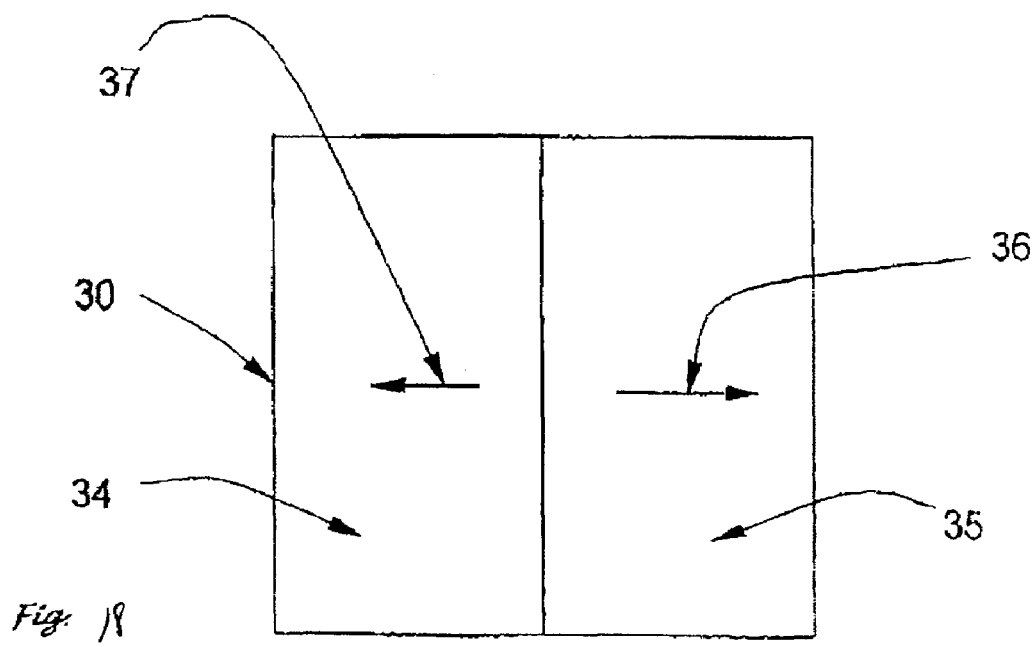
FIG. 18 shows a view of a portion of the light reflecting surface of reflector in FIG. 7 divided into two sections.

FIG. 18 shows reflector 30, of FIG. 7, in a view from the light entry surface, with division of the reflective structure into segments 35 and 36.

If the structure of FIG. 3 which is active on two sides is selected, it would be possible to produce the wide-angle property both horizontally and vertically in a manner pointing to all four sides of the reflector by rotating the second segments 90° relative to one another.

By contrast, it is shown in FIG. 3 that structures of FIG. 7 which are aligned on one side, are arranged juxtaposed in a manner rotated by 180° relative to one another, such that structure surface 34 pointed to the left direction 37 is active, and structure surface 35 pointed to the right direction 36 is active. The arrows show the direction in which the extended cube corner part surfaces point.

Figure 19:
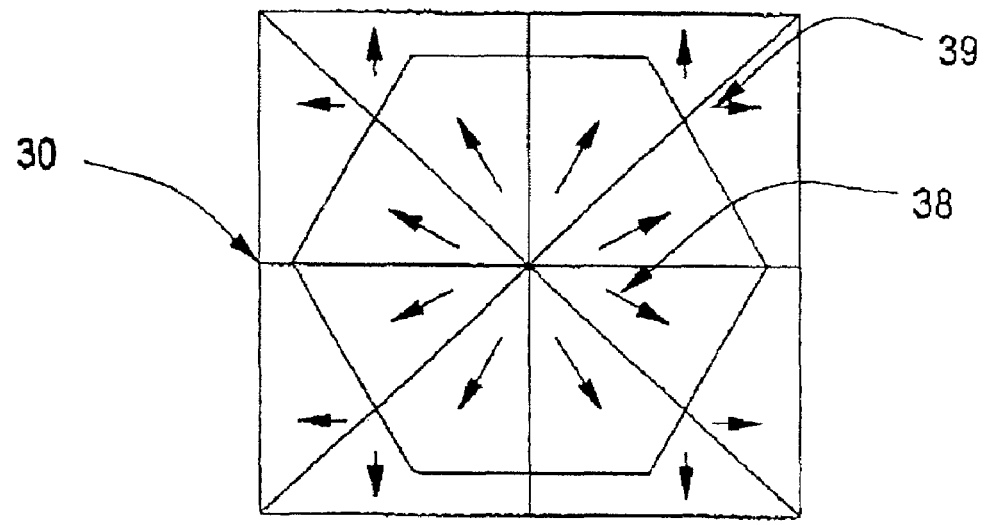
FIG. 19 shows a view of the reflector shown in FIG. 18 from a light entry surface divided into numerous segments.

FIG. 19 shows reflector 30 in a view from a light entry surface, wherein this surface is divided into numerous segments which point in very different directions with extended cube corner part surfaces 38 and 39. However, it is also possible to add segments whose cube corners are not inclined, wherein this cube corner axis corresponds to the normal to the reflector surface.

FIGS. 20–31 show the manufacturing of molds for producing the reflectors with a wide-angle action with the aid of the Gubela plate method.

Figure 20:
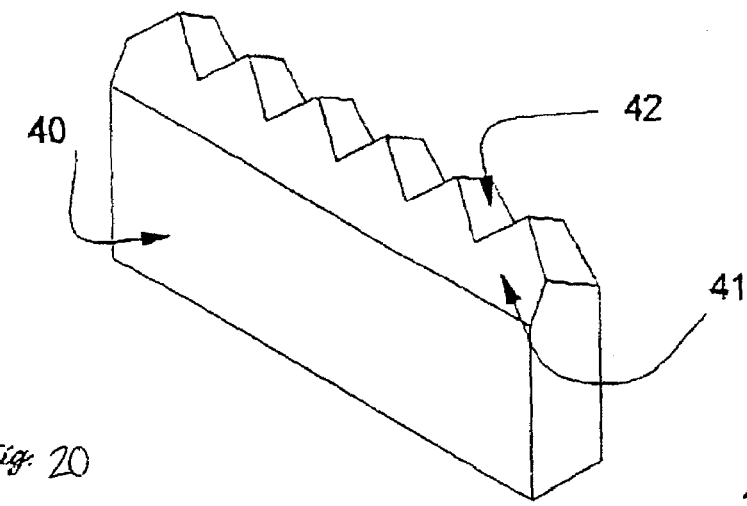
FIG. 20 shows a sectional view of a first mold element for molding the reflector.

For example, FIG. 20 shows a mold element 40 which, constructed as a glass body, can also be a reflective element itself, with a bevel which forms a virtually unlimited cube corner part surface 41. The plate-shaped mold element is notched at the upper edge. The edges of the notches form the two further cube corner part surfaces 42 and 43 visible in FIG. 25.

Figures 21, 22:
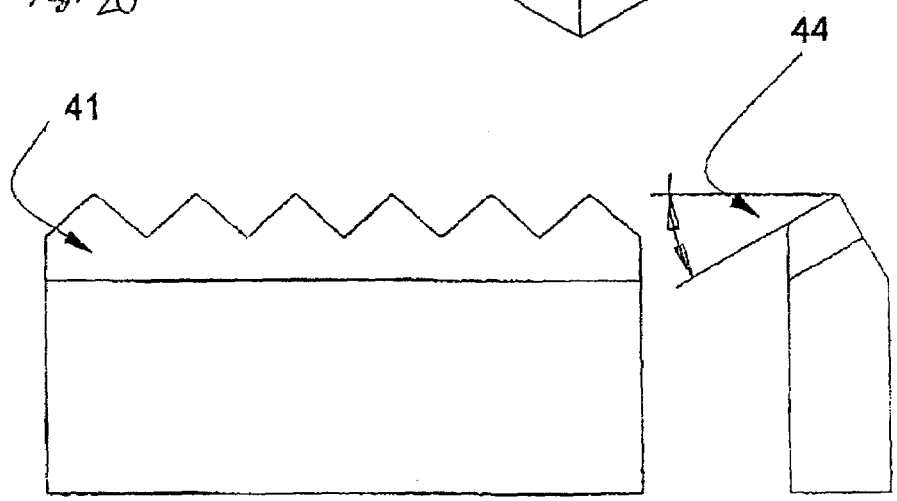
FIG. 21 shows a broad side view of the sectional view of the first mold element in FIG. 20.
FIG. 22 shows a side view or a view rotated 90° with respect to the view in FIG. 21.

FIG. 21 shows the mold element from the broad side with a bevel 41.

FIG. 22 shows the mold element from the narrow side with angle 44, which determines the position of the notch. If the cube corner axis is to be inclined relative to large cube corner part surface 41 by 5°, it would be necessary here to use an angle of approximately 30° with respect to the light entry surface of the reflector.

Figure 23:
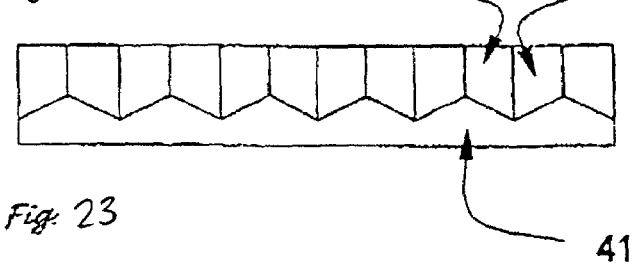
FIG. 23 shows a billet shaped mold element.

FIG. 23 shows the billet-shaped mold element in the view perpendicular to the light entry surface. The cube corner part surface running over the entire length of the billet is situated opposite cube corner part surfaces 42 and 43. All the cube corner part surfaces are virtually at a right angle to one another.

Figure 24:
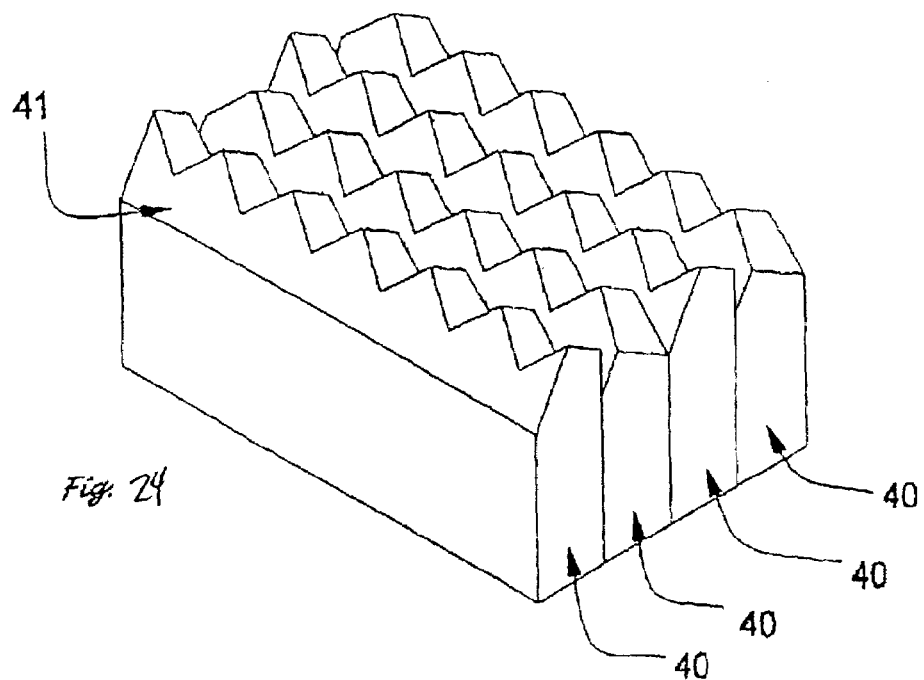
FIG. 24 shows a complete reflector structure assembled from the four mold elements 40.

FIG. 24 shows a complete reflector structure assembled from the four mold elements 40.

Figure 25:
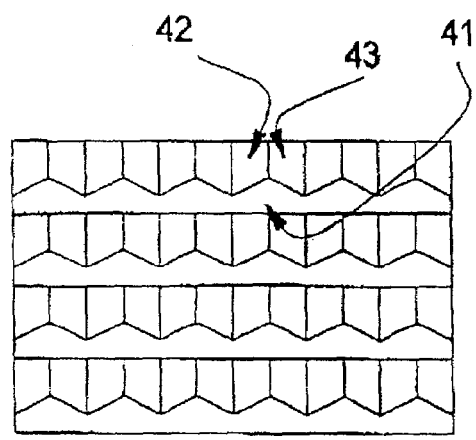
FIG. 25 shows a view of the reflector shown in FIG. 24 in a position normal to the light incidence.

FIG. 25 corresponds to FIG. 24 viewed from the light incidence normal. Cube corner part surface 41 is enlarged in length and width, and cube corner part surfaces 42 and 43.

Figure 26:
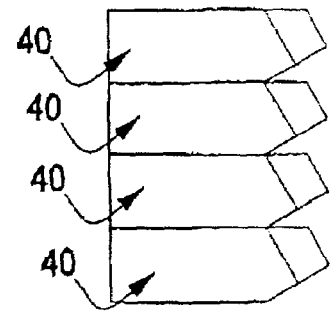
FIG. 26 shows a sectional view of the four mold elements.

FIG. 26 shows a sectional view of the block of the four mold elements.

Figure 27:
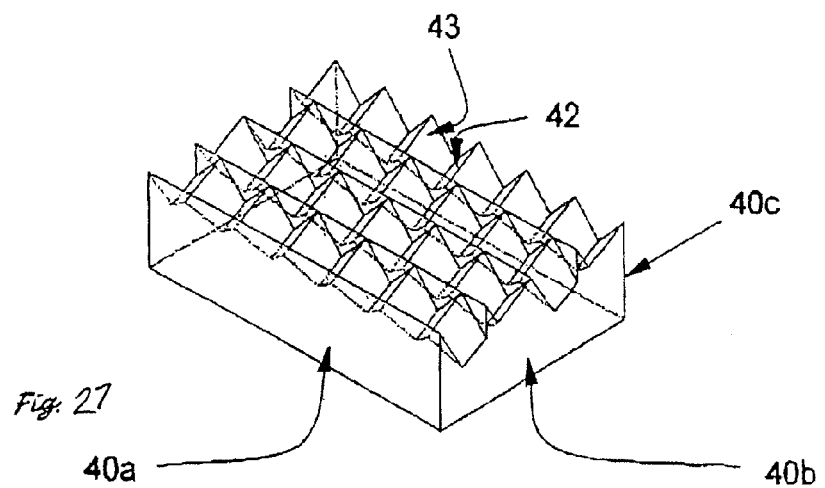
FIG. 27 shows the negative of FIG. 24 which can be used as a mold for wide angle reflectors.

FIG. 27 shows the negative of FIG. 24, which corresponds to the electrochemical forming, and can be used as metallic reflector or as mold structure for molding wide-angle reflectors.

The negative is also a suitable retro-reflector as a glass body with the light entry side illuminated from below.

Cube corner part surfaces 42 and 43 are marked. Cube corner part surface 41 cannot be observed. The outside edges of the negative are marked by 40a and 40b, and the hidden outside edge is marked by 40c, so that the rotation of the negative with reference to the viewer can be recognized in the following FIG. 30.

Figure 28:
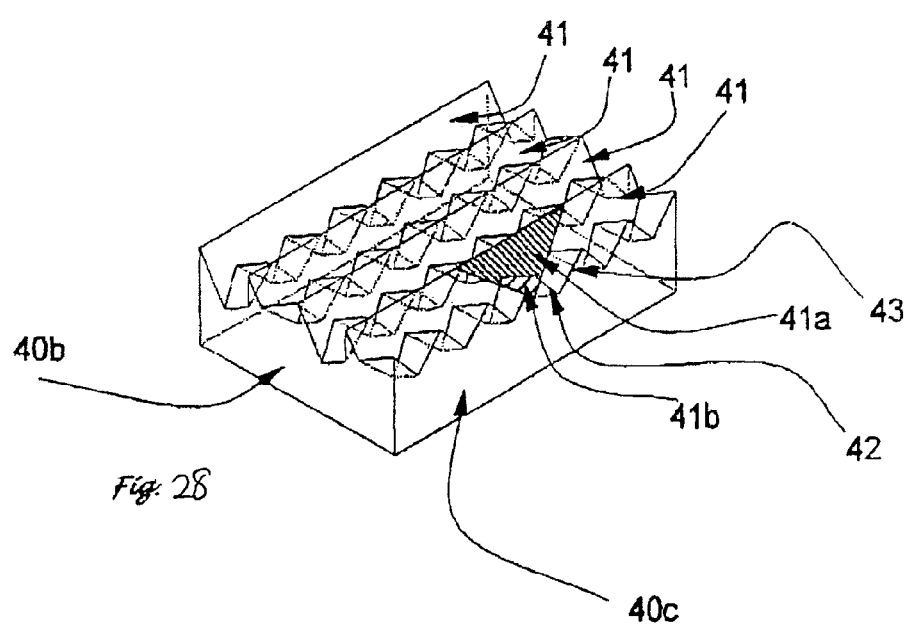
FIG. 28 shows a negative of FIG. 27 which has been rotated to show outside edges.

FIG. 28 shows the negative, rotated relative to the viewer, from FIG. 27, with the outside edge 40b and the outside edges 40c, which are now visible. The cube corner part surfaces 41 extended in accordance with the invention, extend across their width over the entire length of the negative. The cube corner part surfaces 42 and 43 are at virtually a right angle to the cube corner part surface 41. Shown on the latter is the part 41a, visible in this illustration, and the non-visible part 41b of the cube corner part surface 41 which is actually active and which bears reference points suitable for the two marked cube corner part surfaces 42 and 43, in order to collect light from a wide angle of illumination. It is to be seen here that the design with the Gubela billets permits wide angle cube corners of the group of the full cube cube corners together with a very large light capture surface for light from a wide angle. The point is that the large cube corner part surface 41 can simultaneously make available for a plurality of cube corners overlapping reference surfaces which are formed from the sum of all reference points which can capture light and pass on the latter to the other cube corner part surfaces for retroreflection.

Figure 29:
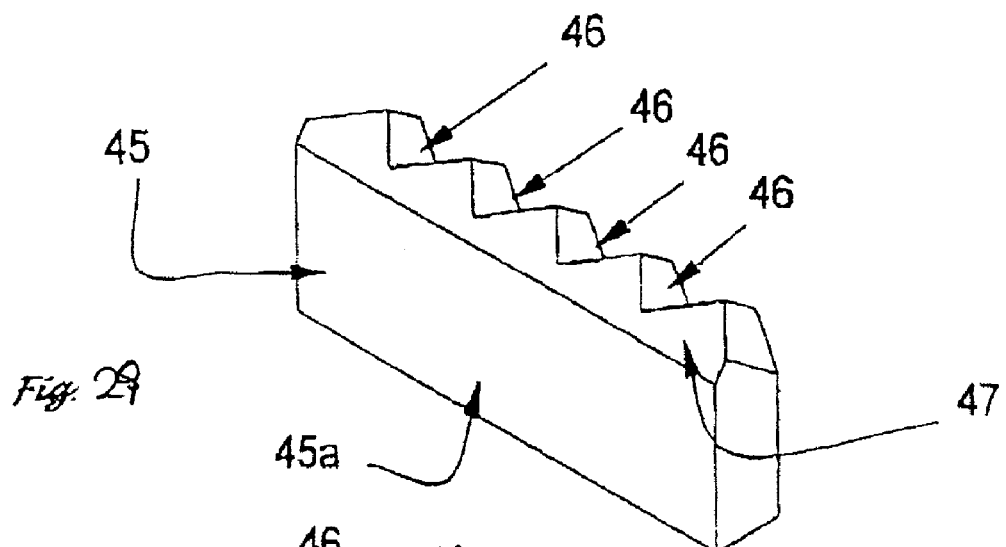
FIG. 29 shows a mold element which resembles a mold element from FIG. 22, with this view having notches.
Figure 30:
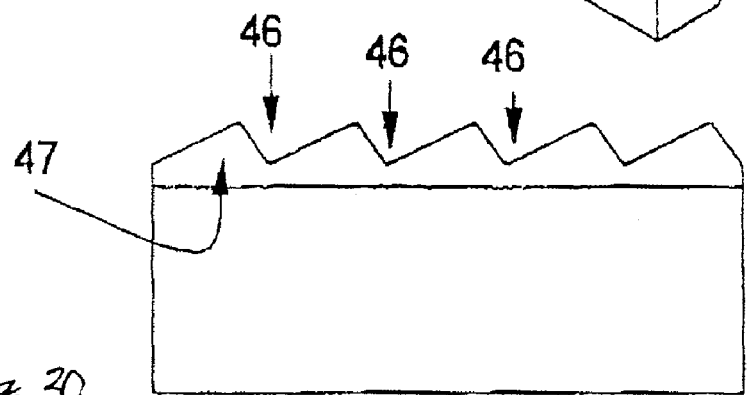
FIG. 30 shows a longitudinal section of mold element 29.
Figure 31:
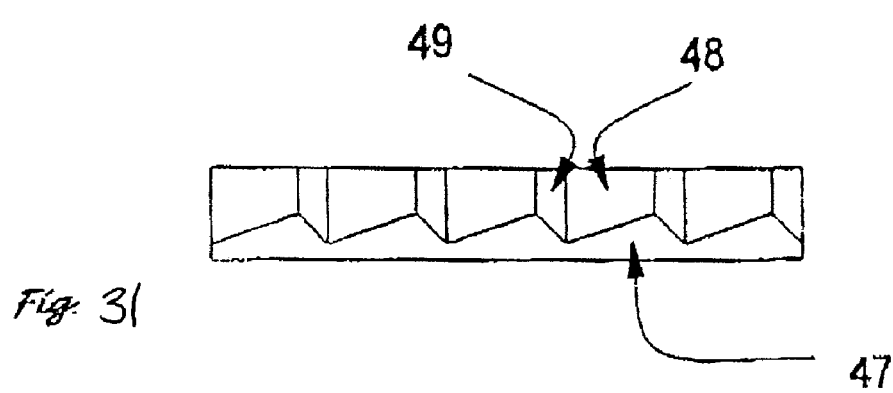
FIG. 31 shows a view of the mold element from a light entry side.

FIG. 29 to FIG. 31 additionally show a further variant of the Gubela billets, in order also to shape additional extended light capture surfaces for a second spatial direction, for example a vertical one.

For example, FIG. 29 shows mold element 45, which resembles mold element 40 from FIG. 22. However, notches 46 which meet bevel 47 are formed with the aid of irregular sides, as may be seen in FIG. 30.

FIG. 30 shows a longitudinal section of the mold element with indicated bevel 47 and irregular notches 46. FIG. 31 shows edges 48 and 49 of the notches 46 which form the two cube corner part surfaces, which are virtually at a right angle to bevel 47, which corresponds to the third cube corner part surface.

FIG. 31 shows the view onto the mold element from the light entry side in accordance with the normal.

Figure 32:
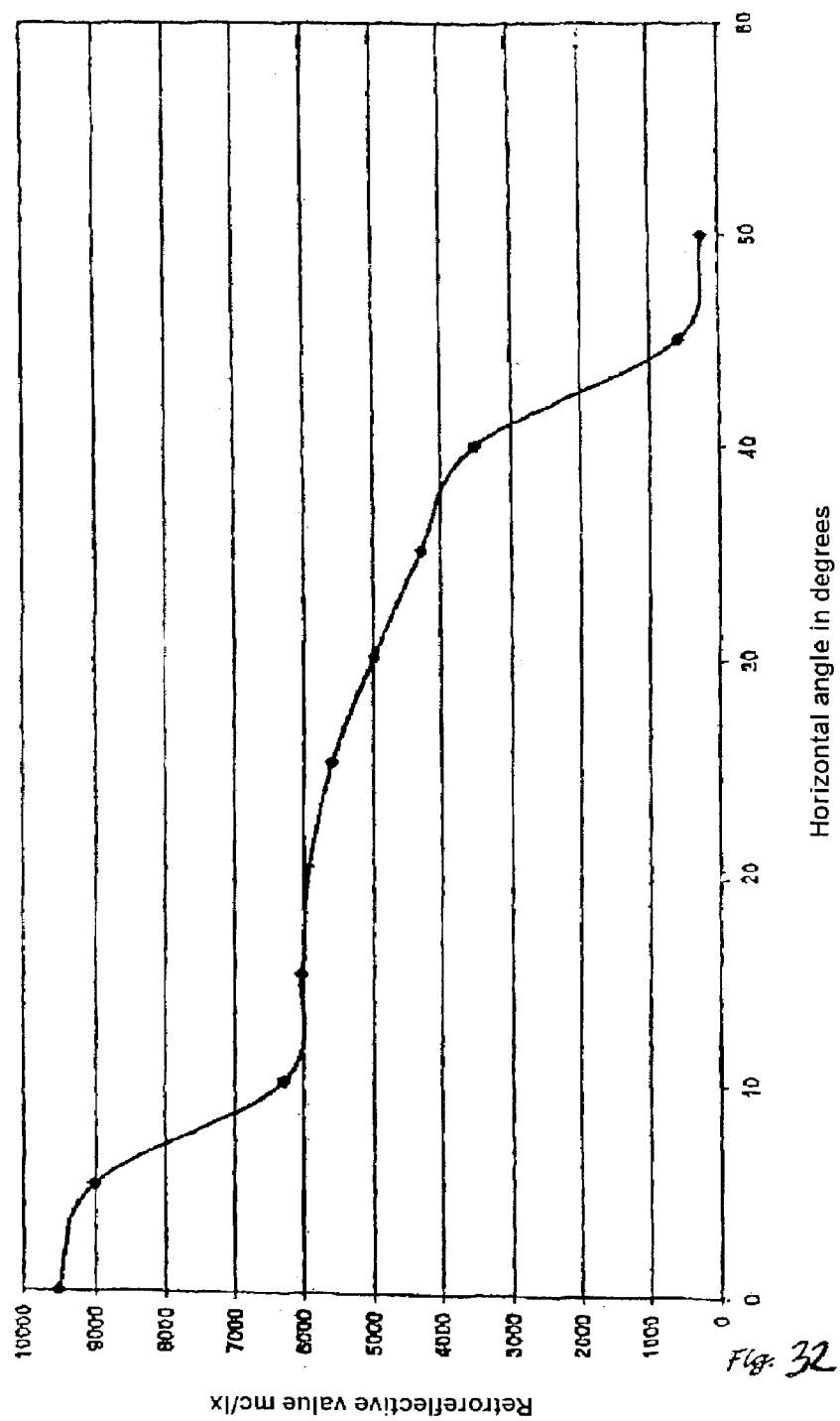
FIG. 32 shows a graph showing the retro-reflective values of a reflector fabricated from PMMA.

FIG. 32 shows the retro-reflective values of an exemplary reflector fabricated from PMMA, which corresponds to the retro-reflective structure of FIG. 3, as a function of the angle of illumination on the horizontal axis of FIG. 4 for an observation angle of 0.2°.

The measurement method for this graph is as follows: the vertical angle is 0°. To block out the reflection on the light entry surface of the reflector, the X offset is 0°, and the Y offset is 0.5°. The horizontal angle is plotted on the X-axis, and the retro-reflective values are plotted in mcd/lx on the Y-axis. The "IMOS Weitwinkel 1" ["IMOS wide angle 1"] test sample is produced under contract for the inventor by IMOS Gubela GmbH, Renchen, Germany, and comprises a 50×50 mm reflector plate with rear-side boxes welded on. The reflecting surface is approximately 47×47 mm and comprises the inventive structures of FIG. 3 with substantially extended cube corner part surfaces whose power maximum is somewhat off of the horizontal position. The reflecting structure consists of cube corners which are set in tracks and whose extended cube corner side is rotated by 180° per track. The inclination of the cube corner axes is 5°, inclined in each case to the extended cube corner surfaces. The cube corners are designed as microcube cube corners whose smallest edge length is approximately 1 mm. The cube corner structure is suitable for sensors with a polarization filter, or laser sensors.

Like all the designs of the cube corner array in the present invention, the design of the structure of the test sample is also suitable for producing microstructured reflecting films.

What is immediately striking is the exceptionally high retro-reflective value of 9,510 mcd/lx at horizontal 0°. Consequently, the reflector already outperforms most retro-reflecting surfaces on the market. With this power value, it corresponds in performance to the currently best performing plastic reflectors on the market, for example the IMOS microcube reflectors. It could have been expected that a wide angle reflector returns extremely poor retro-reflective values as in the past, specifically when it is acting over a wide angle truly beyond 40°, in the case of an angle of illumination of horizontal/vertical 0°. The point is that previous full-cube cube corner designs designated as a wide angle, distribute the light energy wrongly and are not capable of producing powerful retro-reflection above 3,000 mcd/lx in the wide angle of illumination of over 80°.

Given an angle of illumination of 15°, only 50% of the cube corners still operate in the case of the test sample according to the invention. Nevertheless, the cube corners still continue to reach 6 030 mcd/lx. Thus, a reflective value of 3,510 mcd/lx is still achieved for an illumination angle of 40°.

This test sample is only a first proof of the soundness of the invention presented. If the designs of the Gubela billets, shown in FIG. 20 to FIG. 31, are used the wide angle property is extended not only horizontally, but also vertically. Uniform power levels can be attained by applying the teaching in FIG. 16 to FIG. 20. There, the power maxima attainable for different angles of illumination can be taken into account when assembling the segments, such that the reflector can be optimized for its tasks.

FIG. 33 shows the table of the photometric measurement results in the detail of FIG. 32. In the column headed Test Point, the observation angle 0.2° is specified, followed by the angles of illumination in angular degrees for the horizontal (H) and vertical (V). (HV) is the angle of illumination at 0° horizontal and vertical.

It is to be seen that the test sample was shaped for the horizontal wide angle property.

Figure 34:
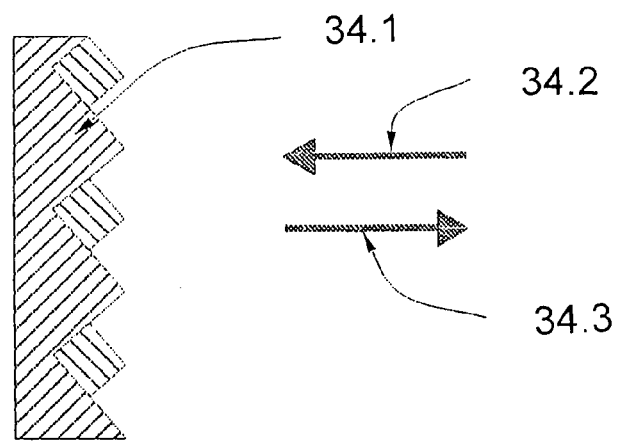
FIG. 34 corresponds to the cross-sectional view of FIG. 5 and shows a wide-angle reflector according to the invention, as a hard part, for example, made of galvanic nickel.

FIG. 34 shows a wide-angle reflector according to the invention, as a hard part, for example made of galvanic nickel. As shown in FIG. 34, the light 34.3 of a sensor falls onto the hard part 34.1 and is reflected as a reflection 34.3.

Figure 35:
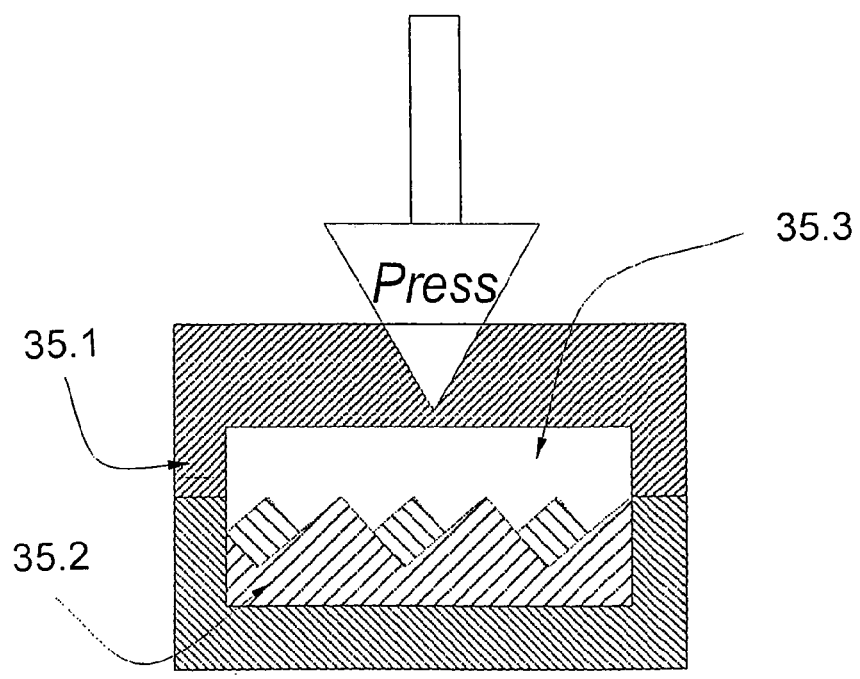
FIG. 35 shows a press mold.

FIG. 35 shows a press mold 35.1. for example a plastic injection-molding mold, having the structure-determining hard part 35.2 and the press part 35.3.

Figure 36:
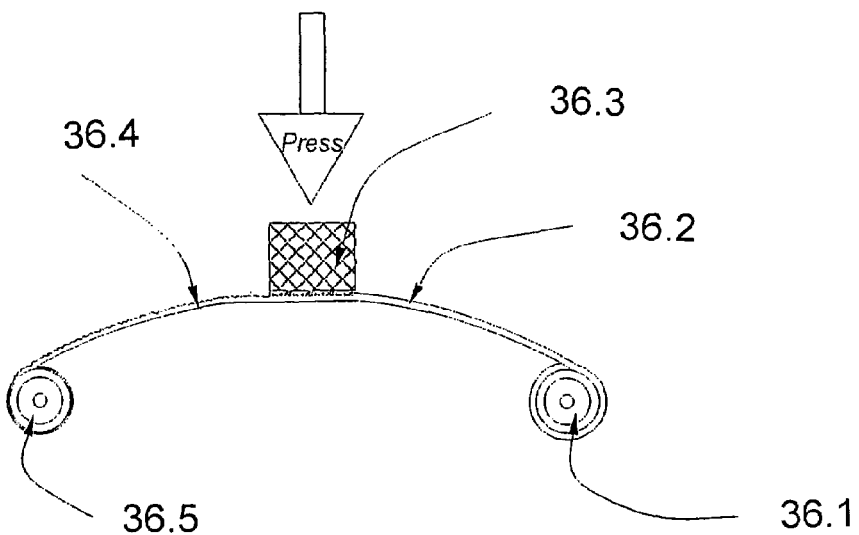
FIG. 36 shows the production of a wide-angle reflector film.

FIG. 36 shows the production of a wide-angle reflector film 36.4. A smooth film 36.2 of transparent acrylic (PMMA), for example, is guided from the roll 36.1 to the press 36.3, and provided with the wide-angle structure according to the invention by means of pressing. The elastic wide-angle reflector 36.4 is then rolled onto the roll 36.5.

Figure 37:
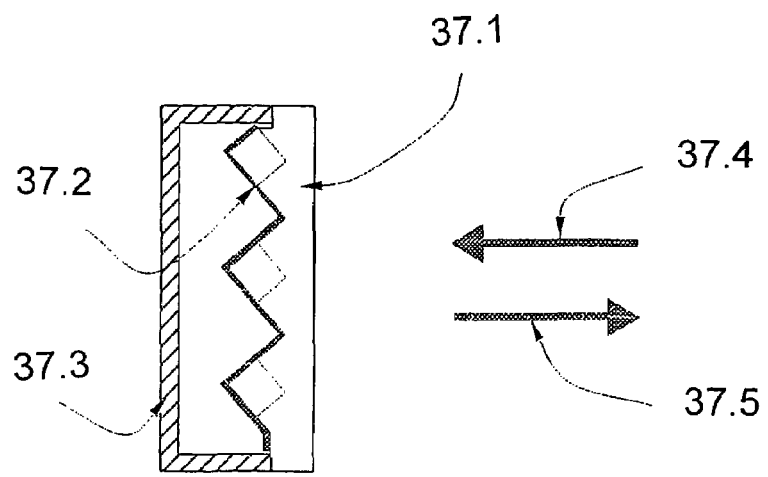
FIG. 37 shows a transparent wide-angle reflector which has a metallic mirror surface on its rear, which was applied by means of vapor deposition or sputtering.

FIG. 37 shows a transparent wide-angle reflector 37.1. which has a metallic mirror surface 37.2 on its rear, which was applied by means of vapor deposition or sputtering. The wide-angle reflector possesses a protective rear wall 37.3. The light of the sensor 37.4 falls onto the wide-angle reflector 37.1 and is reflected as a reflected light beam 37.5.

Accordingly, while at least one embodiment of the present invention has been shown and described, it is to be understood that many changes and modifications may be made thereunto without departing from the spirit and scope of the invention as defined in the appended claims.

What is claimed is:

1. A reflector with a plurality of cube corners, each cube corner comprising:
   a first cube corner part surface;
   a second cube corner part surface; and a third cube corner part surface wherein said first cube corner part surface, said second cube corner part surface and said third cube corner part surface join to form each cube corner wherein at least 50% of the plurality of cube corners have at least one corner part surface that is not square-shaped and has a larger surface area than the remaining cube corner part surfaces;

wherein a cube corner axis of the cube corners deviates by at least 5° from a normal axis to a reflector surface in a direction toward said at least one of said cube corner part surfaces with said larger surface area; and wherein the cube corners are arranged in rows, and wherein the cube corners of mutually neighboring rows have deviations of said cube corner axis from said normal in opposite directions.

2. The reflector according to claim 1, wherein at least 50% of the plurality of cube corners have at least two cube corner part surfaces that are not square-shaped and wherein these at least two cube corner part surfaces have a larger surface area than said remaining cube corner part surfaces.

3. The reflector according to claim 1, wherein said first cube corner part surfaces, said second cube corner part surface, and said third cube corner part surface, are reflecting surfaces.

4. The reflector according to claim 1, wherein the cube corners are formed by billet-shaped plates which have notches on their edge which can form at least two cube corner part surfaces.

5. The reflector according to claim 1, wherein at least a portion of a light entry surface is constructed as a Fresnel lens.

6. The reflector according to claim 5, wherein said light entry surface is entirely constructed as a Fresnel lens.

7. The reflector according to claim 1, wherein the reflector is constructed as an optical glass body, made from glass.

8. The reflector according to claim 1, wherein the reflector is constructed from transparent plastic.

9. The reflector according to claim 8, wherein the reflector is constructed as a hard part.

10. The reflector according to claim 1, wherein the reflector is constructed as an embossed part.

11. The reflector according to claim 1, wherein the reflector is constructed as an elastic film.

12. The reflector according to claim 1, wherein the cube corners are constructed from metal.

13. The reflector according to claim 1, wherein the cube corners have a metal surface, applied to a shaping support body.

14. The reflector according to claim 13, wherein the metal surface is applied by vapor coating or sputtering.

15. A wide-angle sensor system, comprising:
a reflector with a plurality of cube corners, each cube corner comprising;
a first cube corner part surface;
a second cube corner part surface;
a third cube corner part surface wherein said first cube corner part surface, said second cube corner part surface and said third cube corner part surface join to form each cube corner wherein at least 50% of the plurality of cube corners have at least one corner part surface that is not square-shaped and has a larger surface area than the remaining cube corner part surfaces; and
an opto-transmitter for sending out light to the reflector and an opto-receiver for receiving light reflected by the reflector;
wherein a cube corner axis of the cube corners deviates by at least 5° from a normal axis to a reflector surface in a direction toward said at least one of said cube corner part surfaces with said larger surface area; and
wherein said opto-receiver encloses an observation angle of at most 1° with said opto-transmitter.

16. The wide-angle sensor system according to claim 15, wherein said opto-receiver is arranged with reference to said opto-transmitter such that light transmitted to the reflector by said opto-transmitter is reflected on the same axis on which the reflector receives the light transmitted by said opto-transmitter.

17. The wide-angle sensor system according to claim 15, wherein a transmitted beam of the wide-angle sensor is selected with a large shape so that it touches at least two cube corners of the reflector.

* * * * *